N. SAGE.
Wagon Wheel Scraper.
No. 168,675.
Patented Oct. 11, 1875.
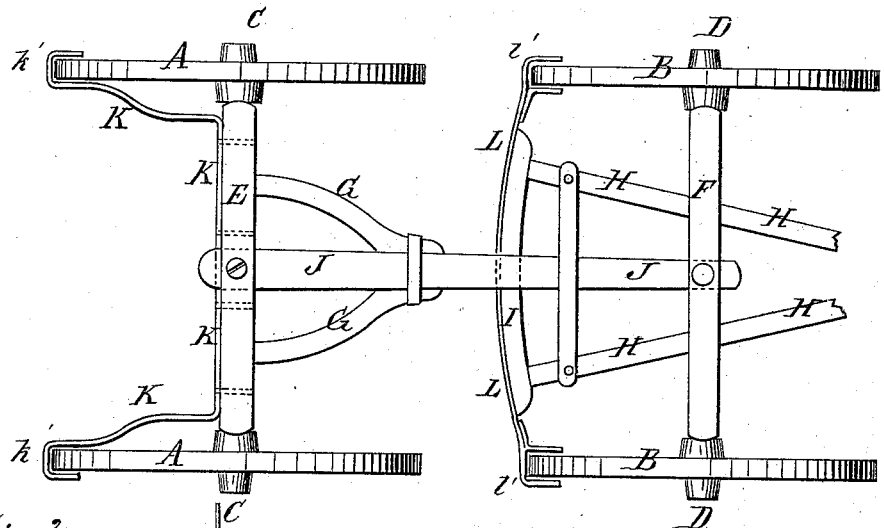
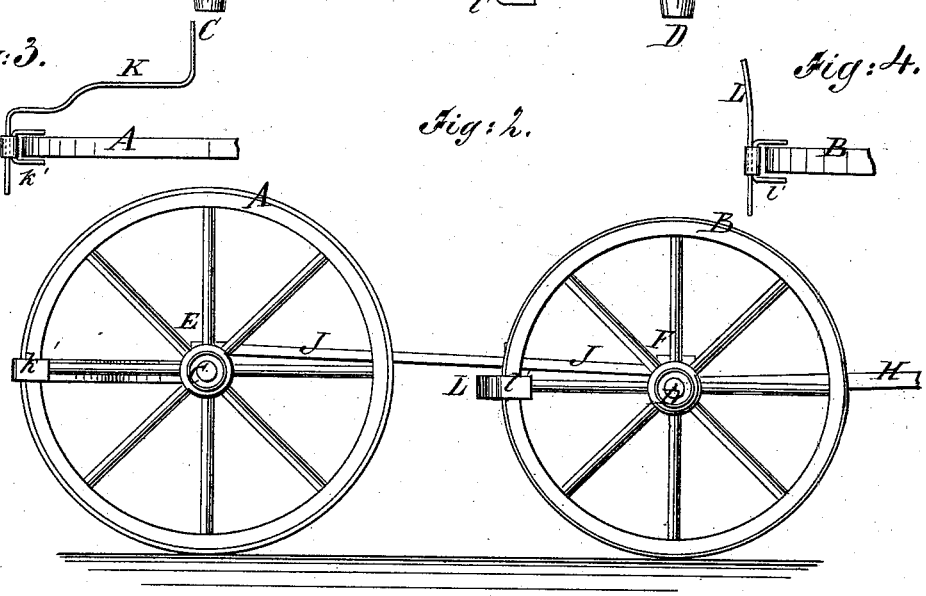
WITNESSES:
INVENTOR:
Norton Sage
BY
ATTORNEYS.

UNITED STATES PATENT OFFICE.

NORTON SAGE, OF PEKIN, ILLINOIS.

IMPROVEMENT IN WAGON-WHEEL SCRAPERS.

Specification forming part of Letters Patent No. 168,675, dated October 11, 1875; application filed August 6, 1875.

*To all whom it may concern:*

Be it known that I, NORTON SAGE, of Pekin, in the county of Tazewell and State of Illinois, have invented a new useful Improvement in Mud-Scrapers for Wagon-Wheels, of which the following is a specification:

Figure 1 is a top view of the running-gearing of a wagon to which my improved scrapers have been applied. Fig. 2 is a side view of the same. Figs. 3 and 4 are detail views, showing modifications in the construction of the rear and forward scrapers.

Similar letters of reference indicate corresponding parts.

The object of this invention is to furnish improved scrapers for the wheels of farm-wagons and other vehicles, to keep them free from prairie mud, clay, and other sticky muds through which they may be drawn, and which shall always be at the same distance from the wheels whether the load be heavy or light, and whether the wagon be drawn forward in a straight or in a curved line.

The invention consists in the combination of the bar or bars, and the U-shaped scrapers, with the rear bolster or the rear axle, and with the rear wheels.

A are the rear wheels, B are the forward wheels, C is the rear axle, D is the forward axle, E is the rear bolster, F is the forward bolster, G are the rear hounds, H are the forward hounds, I is the sway-bar, and J is the reach, about the construction of all of which parts there is nothing new. K is an iron bar which is made in one or two pieces, and which is securely bolted to the rear side of the rear bolster E or rear axle C. The outer parts of the bar or bars K are bent to the rearward, are inclined outward, and project to the rear sides of the wheels A. Upon the outer ends of the bar or bars K are formed, or to them are attached U-shaped scrapers $k'$, which are made of such a size as to pass around the face and sides of the rims of the wheels A, so as, when the said wheels are revolved, to scrape off any mud that may adhere to the said rims, and thus keep them clean. L is an iron bar, which may be made in one or two pieces, and which is attached to the sway-bar I or to the forward hounds H. The outer parts of the bar or bars L project to the rear sides of the forward wheels B, and have U-shaped scrapers $l'$ formed upon or attached to their ends. The scrapers $l'$ are made of such a size as to surround the face and sides of the rims of the forward wheels B, and scrape off any mud that may adhere to them, and thus keep them clean.

By this construction the scrapers $k'$ $l'$ will always be in proper position to clean the wheels A B, whether a light load or a heavy load be placed upon the wagon, and whether the wagon be drawn forward in a straight or in a curved line.

The U-shaped scrapers $k'$ $l'$ may be formed upon or rigidly attached to the bars $k$ $l$, as shown in Figs. 1 and 2; or they may be made loose, so as to slide upon said bars, as shown in Figs. 3 and 4.

The latter construction I prefer, as it enables the scrapers to move and accommodate themselves to any irregular movement of the wheels to prevent binding and friction.

Having thus described my invention, I claim as new and desire to secure by Letters Patent—

The combination of the bar or bars K, and the U-shaped scrapers $k'$, with the rear bolster E or rear axle C, and with the rear wheels A, substantially as herein shown and described.

NORTON SAGE.

Witnesses:
 WILBUR F. HENRY,
 WILLIAM BLENKERON.